(12) United States Patent
Gao et al.

(10) Patent No.: US 8,542,220 B2
(45) Date of Patent: Sep. 24, 2013

(54) ELECTROMAGNETIC STYLUS WITH AUTO-SWITCHING

(75) Inventors: Yu-Guo Gao, Shenzhen (CN); Yong-Hui Hu, Shenzhen (CN); Kai-Kuei Wu, Taipei Hsien (TW); Kun-Chih Hsieh, Taipei Hsien (TW)

(73) Assignees: Hong Fu Jin Precision (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 355 days.

(21) Appl. No.: 12/962,602

(22) Filed: Dec. 7, 2010

(65) Prior Publication Data

US 2011/0279416 A1    Nov. 17, 2011

(30) Foreign Application Priority Data

May 11, 2010  (CN) .......................... 2010 1 0168817

(51) Int. Cl.
*G06F 3/033*    (2013.01)
*G06F 3/041*    (2006.01)
*G06K 11/06*    (2006.01)
*G08C 21/00*    (2006.01)
*G06G 1/14*     (2006.01)
*G06Q 20/00*    (2012.01)

(52) U.S. Cl.
USPC ........................... 345/179; 178/19.04; 705/22

(58) Field of Classification Search
USPC .......................................................... 345/179
See application file for complete search history.

(56) References Cited

U.S. PATENT DOCUMENTS

| | | | | |
|---|---|---|---|---|
| 4,786,764 | A | * | 11/1988 | Padula et al. ............. 178/19.04 |
| 5,889,512 | A | * | 3/1999 | Moller et al. ................. 345/179 |
| 2005/0234778 | A1 | * | 10/2005 | Sperduti et al. ................. 705/22 |
| 2009/0309854 | A1 | * | 12/2009 | Hildebrandt et al. ......... 345/179 |

FOREIGN PATENT DOCUMENTS

| TW | M342550 | 10/2008 |
|---|---|---|
| TW | I313230 | 8/2009 |

\* cited by examiner

*Primary Examiner* — Charles V Hicks
(74) *Attorney, Agent, or Firm* — Altis Law Group, Inc.

(57) ABSTRACT

An electromagnetic stylus includes a body, a core and an induction coil. The body includes a first shell and a second shell telescopically sleeved on the first shell. The core is received in and has a nib end extending out of the first shell. The induction coil is sleeved on one end of the core and is received in the first shell. The first shell is made of material without electromagnetic wave shielding capability. The second shell is made of material with electromagnetic wave shielding capability. The second shell is configured to slide along the first shell between two positions, to shield or not to shield part of the induction coil.

12 Claims, 5 Drawing Sheets

ELECTROMAGNETIC STYLUS WITH AUTO-SWITCHING

BACKGROUND

1. Technical Field

The present disclosure relates to an electromagnetic stylus with auto-switching.

2. Description of Related Art

Electromagnetic styluses are commonly used with corresponding electronic tablets. An electromagnetic stylus often includes a body, a core secured in the body, an induction coil wound on one end of the core, and a circuit board. The electromagnetic stylus is not physically connected to the electronic device while writing or drawing. Instead, signals are input via electromagnetic waves sent and received between the tablet and the stylus, on which a control must be activated to turn on the electromagnetic stylus before use. Convenience of use of the device is thus negatively affected.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
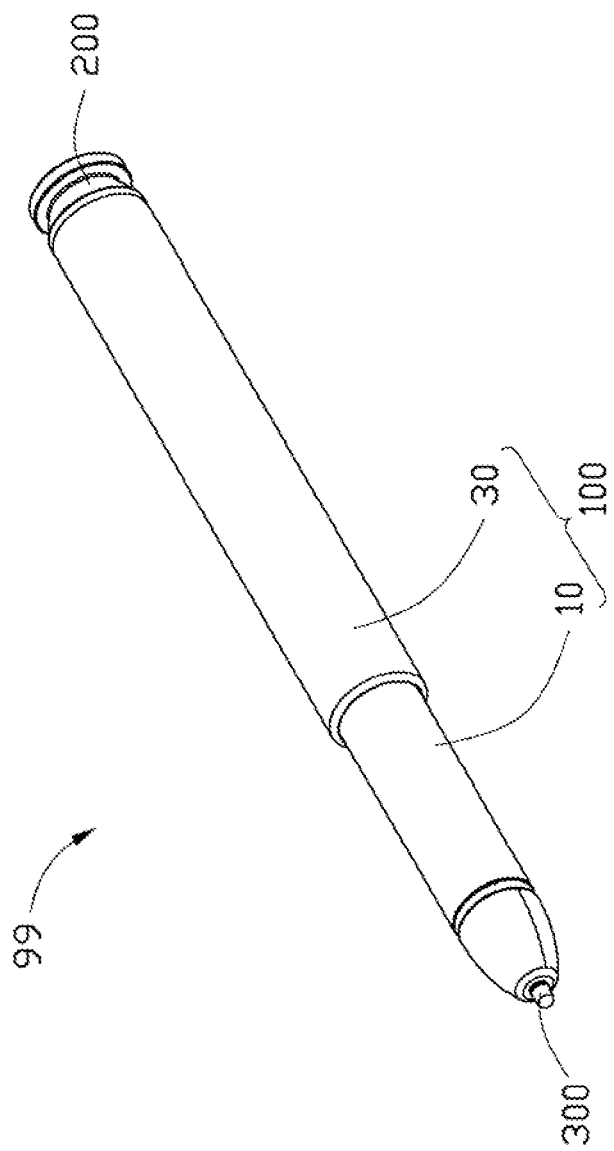
FIG. 1 is an isometric view of an exemplary embodiment of an electromagnetic stylus in a retracted state.

Referring to FIG. 1, an electromagnetic stylus 99 is disclosed as an exemplary embodiment. The electromagnetic stylus 99 includes a body 100, a cap 200 secured in an end of the body 100, and a core 300 received in the body 100 having a nib end extending out of the body 100.

Figure 2:
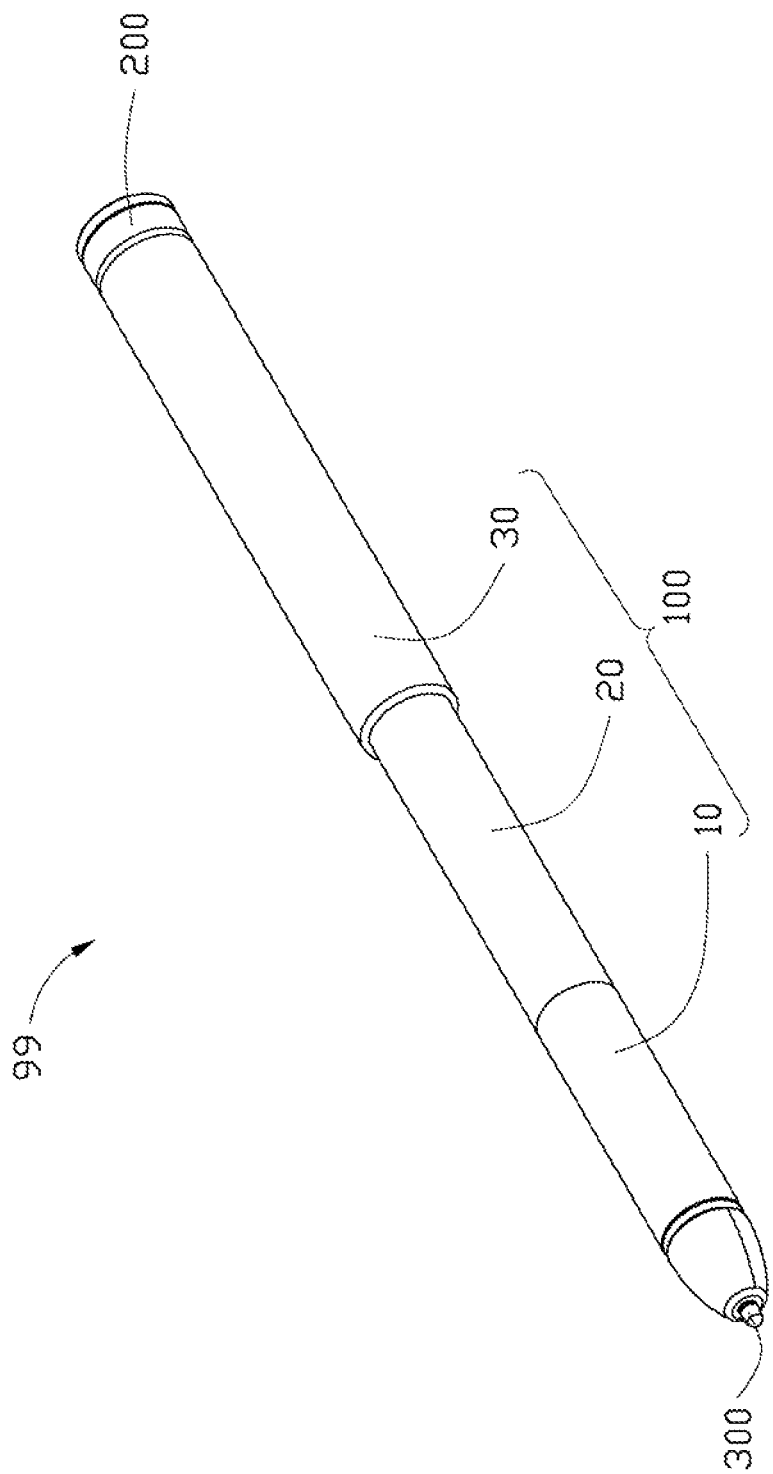
FIG. 2 is an isometric view of the electromagnetic stylus of FIG. 1 in an extended state.

Referring to FIG. 2, the body 100 includes a first shell 10, a second shell 30, and a third shell 20 fixed at one end of the first shell 10. The cap 200 is connected to the second shell 30. The second shell 30 is telescopically sleeved on the shells 10, 20. The first shell 10 is made of material without electromagnetic wave shielding capability. The shells 20, 30 are made of material with electromagnetic wave shielding capability. In the embodiment, the first shell 10 can be made of plastic and the second and third shells 20, 30 can be made of metal.

Figure 3:
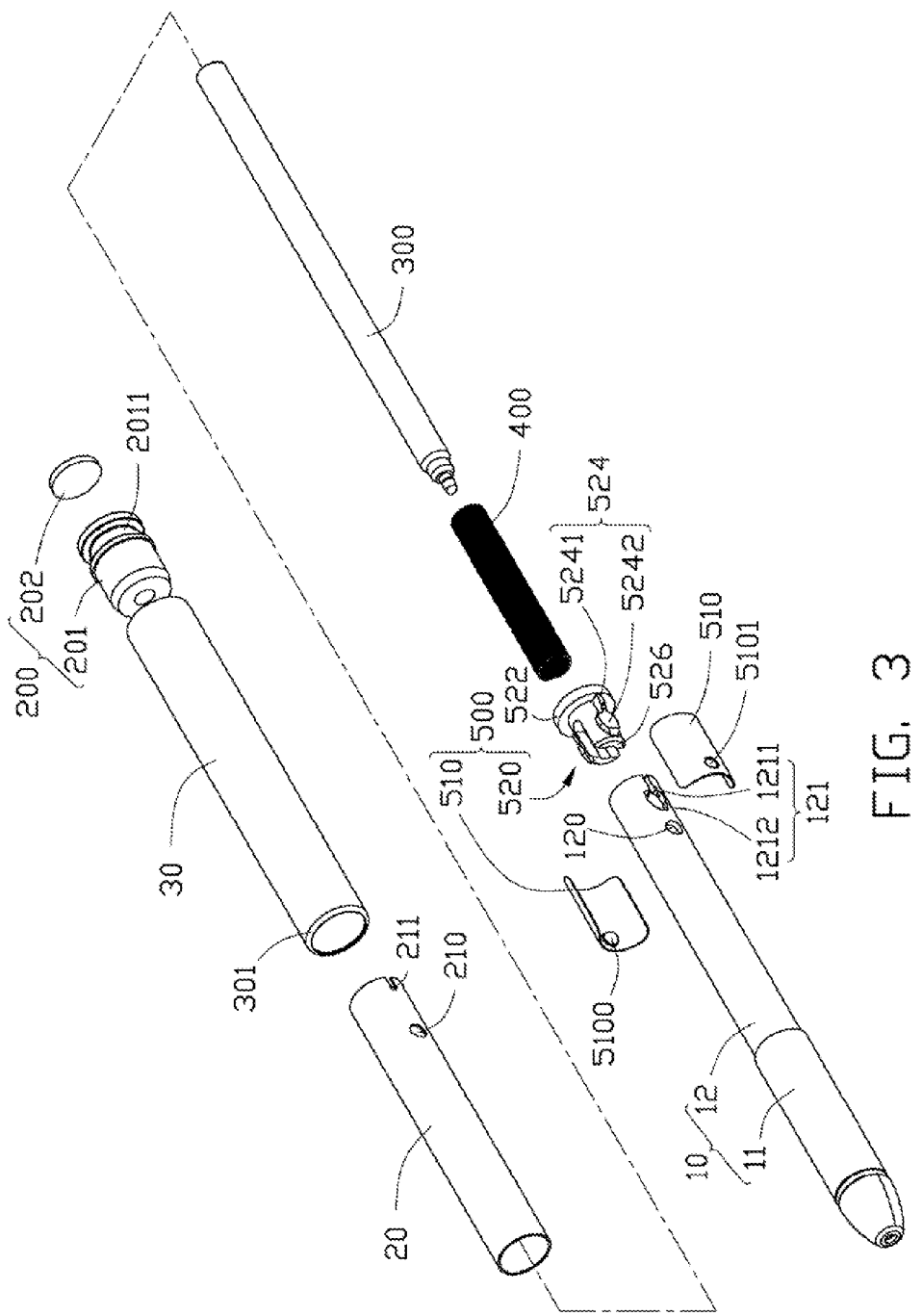
FIG. 3 is an exploded view of the electromagnetic stylus of FIG. 1.

Referring to FIG. 3, the first shell 10 includes a front portion 11 and a back portion 12 connected to the front portion 11. The diameter of the front portion 11 exceeds that of the back portion 12. Two first through holes 120 and two fixing grooves 121 are respectively defined in the circumferential surface of the back portion 12, adjacent to the end of the back portion 12 away from the front portion 11. The two fixing grooves 121 are closer to the end of the back portion 12 than the two first through holes 120. The fixing groove 121 includes an open ended slot 1211 extending through the end and an opening 1212 communicating with the slot 1211. The opening 1212 is essentially wedge-shaped.

The third shell 20 defines two second through holes 210 and two slots 211, adjacent to an end of the third shell 20. Each second through hole 210 corresponds to one of the first through holes 120. Each slot 211 corresponds to and is shorter than one of the slots 1211.

The electromagnetic stylus 99 further includes an induction coil 400 sleeved on one end of the core 300, and a fixing mechanism 500. The fixing mechanism 500 is secured on the first shell 10 and is configured for connecting the third shell 20 with the first shell 10. Both the induction coil 400 and the end of the core 300 are received in the front portion 11 of the first shell 10.

The fixing mechanism 50 includes two curved pieces 510 fixed on the back portion 12, and a fixing portion 520 fixed in the end of the back portion 12. An elastic tab 5100 protrudes from the inner surface of one of the curved pieces 510. Another elastic tab 5101 protrudes from the outer surface of the other one of the curved pieces 510. The tabs 5100, 5101 match the first through hole 120 and the second through hole 210 correspondingly.

The fixing portion 520 includes a disc shaped chassis 522, two elastic resisting elements 526 vertically protruding from the chassis 522, and two elastic clamping elements 524 vertically protruding from the outer lateral surface of the resisting elements 526, respectively. The diameter of the chassis 522 exceeds the inner diameter of the third shell 20. The chassis 522 resists the end of the third shell 20 having the two slots 211. The clamping element 524 includes a rib 5241 and a clamping block 5242 interlinked with the rib 5241. The rib 5241 and the clamping blocks 5242 are respectively received in the opening 1211 and the slot 1212. The resisting elements 526 are configured for resisting the end of the core 300 away from the nib of the core 300.

The cap 200 includes a body 201 and a cover 202 fixed on the body 201. A protruding rib 2011 extends around the lateral surface of the body 201. The protruding rib 2011 is configured for resisting the end of the second shell 30 sleeved on the body 201. The second shell 30 includes a protruding rib 301 extending inwardly from the edge of a nib end thereof. The protruding rib 301 is configured for resisting the curved piece 510.

In assembly, the core 300 with the induction coil 400 sleeved thereon, the fixing mechanism 500 and the cap 200 are assembled to the body 100 in sequence. Specifically, referring to FIGS. 3, 4 and 5, the induction coil 400 with the core 300 is received in the first shell 10 from the end where the fixing groove 121 is defined. The induction coil 400 is then received in the front portion 11 of the first shell 10. The tabs 5100 and 5101 of the curved pieces 510 are aligned with the first through holes 120 of the back portion 12 respectively, and then received in the first through holes 120. The third shell 20 is sleeved on the back portion 12 and rotated until the tabs 5100 and 5101 of the curved pieces 510 are respectively received in the second through holes 210. The third shell 20 is thus fixed on the first shell 10.

The fixing portion 520 is received in the end of the back portion 12 where the fixing groove 121 is defined, until the first and second clamping blocks 5241, 5242 are respectively received in the first and openings 1211, 1212. The assembled first shell 10, third shell 20 and fixing mechanism 500 from the end of the second shell 30 away from the protruding rib 301 are received into the intracanalicular part of the second shell 30, until the curved pieces 510 resist the protruding rib 301 of the second shell 30. Finally, the cap 200 is assembled on the second shell 30.

Figure 4:
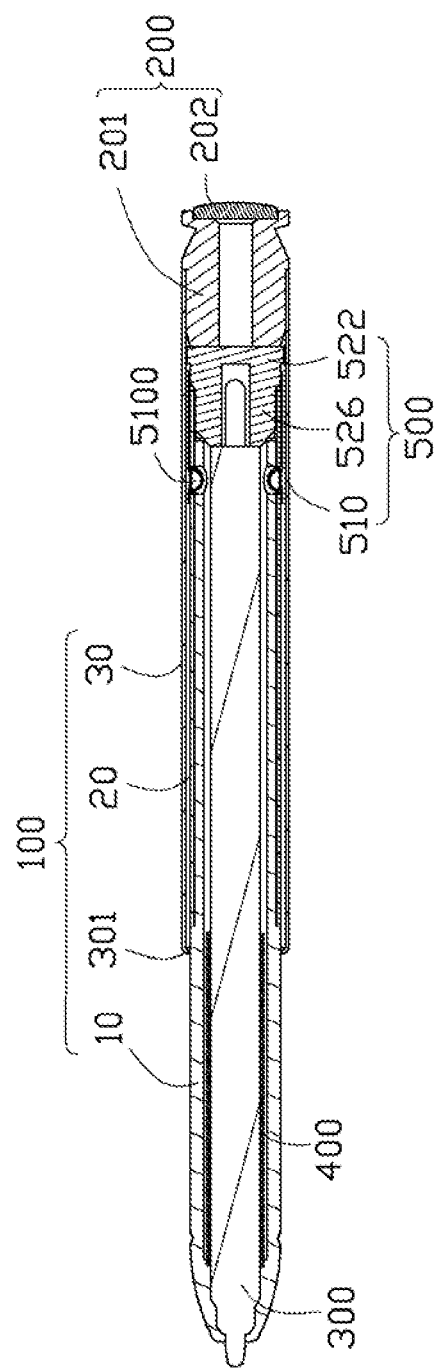
FIG. 4 is a sectional view of the electromagnetic stylus of FIG. 1, taken along the longitudinal axis of the electromagnetic stylus.
Figure 5:
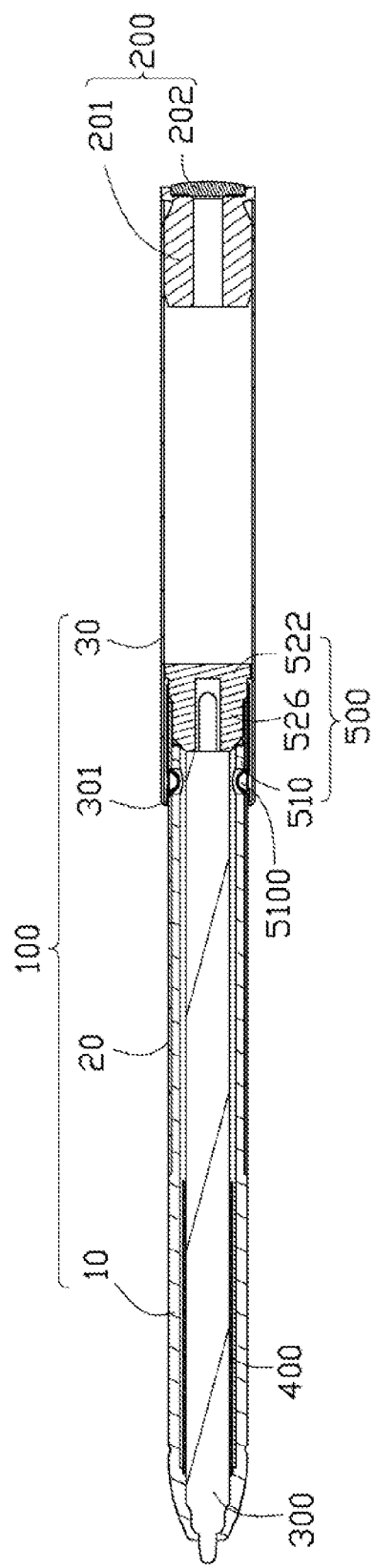
FIG. 5 is a sectional view of the electromagnetic stylus of FIG. 2, taken along the longitudinal axis of the electromagnetic stylus.

Referring to FIGS. 1 and 4, the electromagnetic stylus 99 is off. The third shell 20 is totally retracted into the second shell 30. The second shell 30 sleeves on one end of the first shell 10 and shields part of the induction coil 400. The portion of induction coil 400 shielded by the second shell 30 is non-operational. The electromagnetic stylus 99 cannot receive or send electromagnetic waves. The protruding rib 2011 of the cap 200 resists the end of the second shell 30, preventing the second shell 30 from sliding toward the first shell 10.

During use, the second shell 30 is slid along the third shell 20 away from the induction coil 400 until the induction coil 400 is unshielded. The electromagnetic stylus 99 is turned on. The second shell 30 continues to slide towards the cap 200 until the chassis 522 of the fixing mechanism 500 resists the protruding rib 301. Together referring to FIGS. 2 and 5, the electromagnetic stylus 99 is now of a comfortable length for use.

In the embodiment, the second shell 30 is slid along the front portion 11 of the first shell 10 to the shield or non-shield part of the induction coil 400 to turn the electromagnetic stylus 99 on and off conveniently.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electromagnetic stylus comprising:
a body comprising a first shell and a second shell telescopically sleeved on the first shell;
a core received in and having a nib end extending out of the first shell; and
an induction coil sleeved on one end of the core and received in the first shell;
wherein the first shell is made of material without electromagnetic wave shielding capability, the second shell is made of material with electromagnetic wave shielding capability, and the second shell is configured to slide along the first shell between, a first position where a part of the induction coil is shielded so that the electromagnetic stylus cannot receive or send electromagnetic waves, and a second position where the induction coil is unshielded so that the electromagnetic stylus can receive or send electromagnetic waves.

2. The electromagnetic stylus as described in claim 1, wherein the first shell comprises a front portion and a back portion connected to the front portion, and the electromagnetic stylus further comprises a third shell and a fixing mechanism secured on the back portion and connecting the third shell with the first shell.

3. The electromagnetic stylus as described in claim 2, wherein the back portion defines two fixing grooves in the end away from the front portion, and the fixing mechanism comprises two elastic clamping elements coupled with the fixing grooves respectively.

4. The electromagnetic stylus as described in claim 3, wherein the back portion further defines two first through holes, the third shell defines two second through holes, the fixing mechanism further comprises two curved pieces, each of the curved piece comprises two tabs protruding from the inner and outer surface thereon respectively, the tabs protruded from the inner surfaces of the curved pieces are received in the first through holes respectively, and the tabs protruded from the outer surfaces of the curved pieces are received in the second through holes respectively.

5. The electromagnetic stylus as described in claim 4, wherein the third shell further defines two fixing grooves, each of the fixing grooves comprises a slot and an opening communicating with each other, each of the clamping elements comprises a rib and a clamping block interlinked with the rib, and the rib and the clamping block are respectively received in the opening and the slot.

6. The electromagnetic stylus as described in claim 4, wherein the second shell comprises a protruding rib extending inwardly from the edge of a nib end thereof, for resisting the two curved pieces.

7. The electromagnetic stylus as described in claim 3, wherein the fixing mechanism further comprises a chassis and two elastic resisting elements vertically protruding from the chassis, the clamping elements vertically protrude from the outer lateral surface of the resisting elements respectively.

8. The electromagnetic stylus as described in claim 7, wherein the diameter of the chassis is larger than the inner diameter of the third shell.

9. The electromagnetic stylus as described in claim 7, wherein the resisting elements resist against the end of the core away from the nib of the core.

10. The electromagnetic stylus as described in claim 2, wherein the diameter of the front portion exceeds that of the back portion.

11. The electromagnetic stylus as described in claim 2, wherein both of the induction coil and the end of the core sleeved by the induction coil are received in the front portion.

12. The electromagnetic stylus as described in claim 2, wherein the first shell is made of plastic, the second and third shells are made of metal.

* * * * *